United States Patent Office 3,541,669
Patented Nov. 24, 1970

3,541,669
ORIENTING INERTIA WELDED PARTS
Ralph W. Yocum, Peoria, Ill., assignor to Caterpillar Tractor Co., Peoria, Ill., a corporation of California
Filed Nov. 20, 1968, Ser. No. 777,290
Int. Cl. B23k 27/00
U.S. Cl. 29—470.3                    4 Claims

ABSTRACT OF THE DISCLOSURE

A first workpiece is inertia friction welded to a second workpiece wherein both workpieces are allowed to rotate near the end of the weld cycle to permit precise orientation of the workpieces with respect to each other.

BACKGROUND OF THE INVENTION

This invention relates to friction welding of the general type wherein two workpieces are subjected to relative rotation while in dubbing contact with each other to generate frictional heat to raise the workpieces to a suitable welding temperature, whereupon the relative rotation subsides and a bond is formed between the workpieces. The invention is particularly directed to a method of inertia friction welding a first workpiece to a second workpiece wherein the joined workpieces are precisely oriented with respect to each other.

In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to the engagement of the parts at the interface. The stored energy is discharged into the interface through frictional heating and plastic working developed at the interface as the rubbing contact slows the rotating weights and the bonding cycle is concluded.

Many parts, because of their configuration or intended application require precise orientation or angular alignment when finish welded. Oftentimes manufacturers are forced to use less efficient and more costly techniques for welding or otherwise joining such parts since angular alignment is largely uncontrollable when inertia friction welding. Thus, in the inertia friction welding process, stopping rotation of the spindle is normally determined only by expenditure of the energy from the rotating inertia weights which has no inherent relation to the angular position of the spindle.

Accordingly, it is the principal object of the present invention to provide a method of inertia friction welding a first workpiece to a second workpiece wherein the joined workpieces are precisely oriented with respect to each other.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENT

Figure 1:
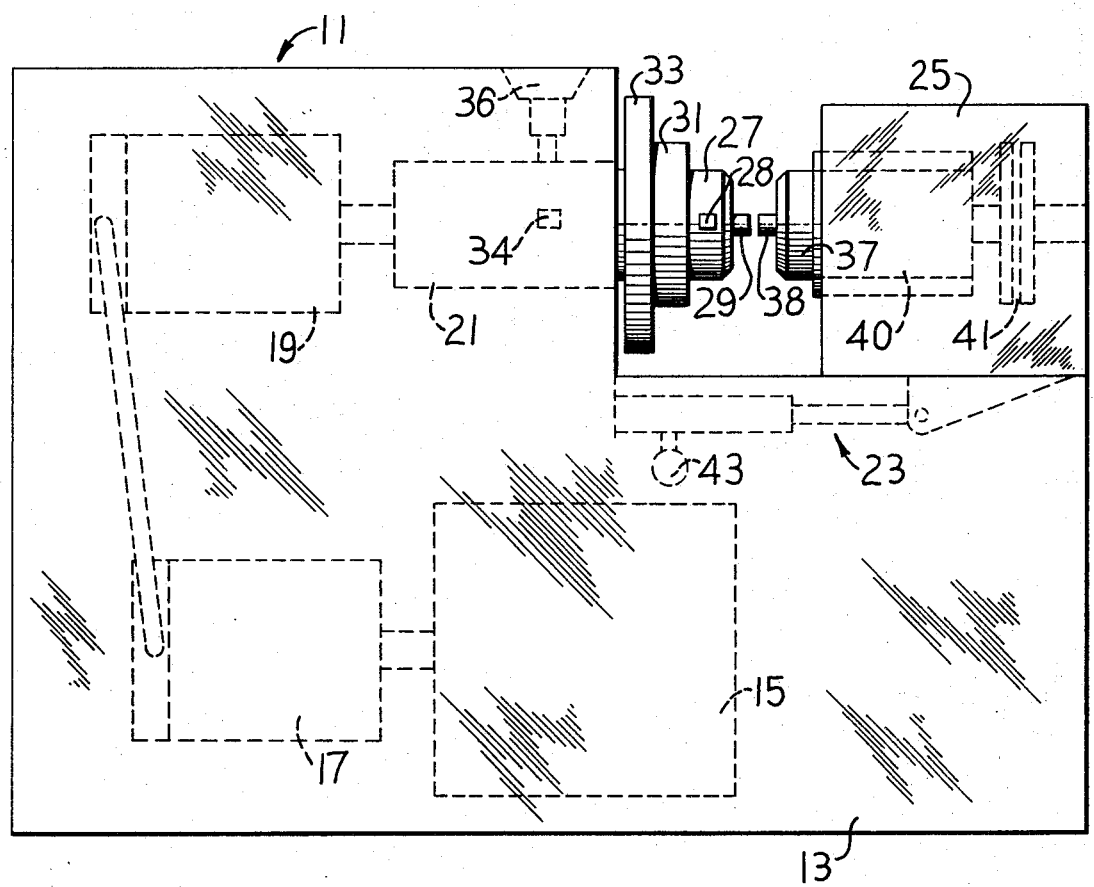
FIG. 1 is a side elevational view illustrating one embodiment of an inertia friction welding machine which may be used to practice the present invention; and, FIG. 2 is a schematic illustration which depicts certain control features of the device illustrated in FIG. 1.

An inertia welding machine constructed in accordance with one exemplary embodiment of the present invention is indicated generally by the reference numeral 11 in FIG. 1. The welding machine 11 comprises a frame or base 13, a motor 15, a hydraulic pump 17, a hydraulic motor 19, a rotatable head stock spindle 21, a hydraulic ram assembly 23, and a longitudinally movable tailstock assembly 25.

A chuck 27 is mounted on one end of the rotatable spindle 21 and is adapted to securely hold a first workpiece 29. Flywheel masses 31 and 33 are also mounted upon the rotatable spindle 21 in the vicinity of the chuck 27 as shown. Indicator means 28 and 34 are provided at precisely aligned locations on the chuck 27 and the spindle 21, respectively. A pickup or position sensing device 36 is mounted within the frame 13 and in close proximity to the rotatable spindle 21. The position sensing device 36 is capable of sensing the exact position of the spindle 21 by means of the spindle indicator 34.

Also mounted on the machine and in fluid communication with the hydraulic ram assembly 23 is a pressure actuated time sensing device 43 which activates the position sensing device at a certain predetermined time during the weld cycle.

A second chuck 37 is provided within the tailstock assembly 25 for securely holding a second workpiece 38. The chuck 37 is connected to a spindle-like member 40 which is normally held stationary by means of a brake assembly 41.

The welding machine 11 may be operated in the following manner in order to weld two pieces together and provide proper orientation of the workpieces with respect to each other at the end of the weld cycle. The workpiece 29 is first inserted into the head stock chuck 27 and is precisely oriented in relation to the indicator 28 and hence to the indicator 34 and the pickup device 36. The workpiece 38 is then inserted into the tailstock chuck 37 and firmly clamped. After both workpieces have been firmly clamped in their respective holding fixtures, the ram assembly 23 is actuated to move the tailstock assembly 25 into close proximity with the head stock portion of the machine so that a small gap exists between the workpieces 29 and 38.

The brake mechanism 41 at this time is disengaged so that the spindle assembly 40 can be rotated by hand to precisely orient the workpiece 38 with respect to the workpiece 29. This insures that the workpieces 29 and 38 are positioned with the desired preoriented relationship before initiation of the weld cycle. The brake mechanism 41 is then engaged so that the spindle assembly 45 is fixedly held against rotation.

At this time the motor 15 is activated thereby rotating the hydraulic pump 17 which in turn supplies hydraulic fluid to the hydraulic motor 19. The hydraulic motor 19 is coupled to the rotatable spindle 21 and rotates the spindle 21, the attached flywheels 31 and 33, and the chuck 27 which holds the workpiece 29.

At a predetermined velocity, the power to the spindle 21 is discontinued, either by shutting down the motor 15 or by shifting the components of the pump 17 and motor 19 so that no more power is supplied to the spindle 21. At the same time that the power is disconnected from the spindle 21, hydraulic fluid under pressure is supplied to the ram assembly 23 which forces the tailstock assembly 25 forward and the two workpieces 29 and 38 come into contact under pressure.

As the ram assembly 23 is pressurized, causing the rotating weld member 29 and nonrotating weld member 38 to come into contact, the pressure actuated timing device 43 is also energized. The timing device 43 begins timing the weld cycle from the time of initial contact between the workpieces for a purpose which will be better understood from the description below.

At this stage of the operation the interface between the workpieces 29 and 38 is heated by friction to the welding temperature. As the wokpieces are heated to the welding temperature the friction between the workpieces dissipates the energy that is stored in the freely rotating spindle 21 and flywheel masses 31 and 33 such that the entire head stock assembly begins to slow down.

After sufficient and predetermined weld cycle has been completed the timing device 43 energizes the pickup assembly 36. At a predetermined and preset speed or point of rotation of the spindle 21, as indicated by the indicator means 34, the pickup assembly 36 will signal brake 41 to release the tailstock spindle 40. In other words the pickup 36 monitors the position of the spindle 21 and at the proper point of rotation signals the release of brake 41.

The frictional contact between the workpieces 29 and 38 will then cause the chuck 37 to rapidly accelerate to the speed of the chuck 27. Once the chuck 37 reaches the speed of the chuck 27 relative motion between the workpieces 29 and 38 ceases and the weld is completed.

After the workpieces 29 and 38 are joined both the spindle 21 and spindle 40 will be rotating at the same low speed since they are coupled together by the joined workpieces. The brake 41 may then be gradually applied to stop rotation of the spindles. The weld assembly can then be removed by releasing the chucks and actuating the ram assembly 23 to move the tailstock assembly 25 away from the chuck 27.

Orientation of the two workpieces 29 and 38 is insured by having the pickup device 36 release the brake 41 at precisely the right moment. Thus, the time for the tailstock workpiece 38 to reach the speed of the rotating workpiece 29 must be taken into consideration and allowed for. Generally, the time for the tailstock weld member 38 to attain the speed of the rotating weld member 29 will be quite small since the difference in masses is quiet large and the speed at this point in the operation is relatively slow. The exact time delay or amount of rotation which must be allowed for will vary depending upon cuch factors as the workpiece diameters, the weld material, and the flywheel mass and speed.

Figure 2:
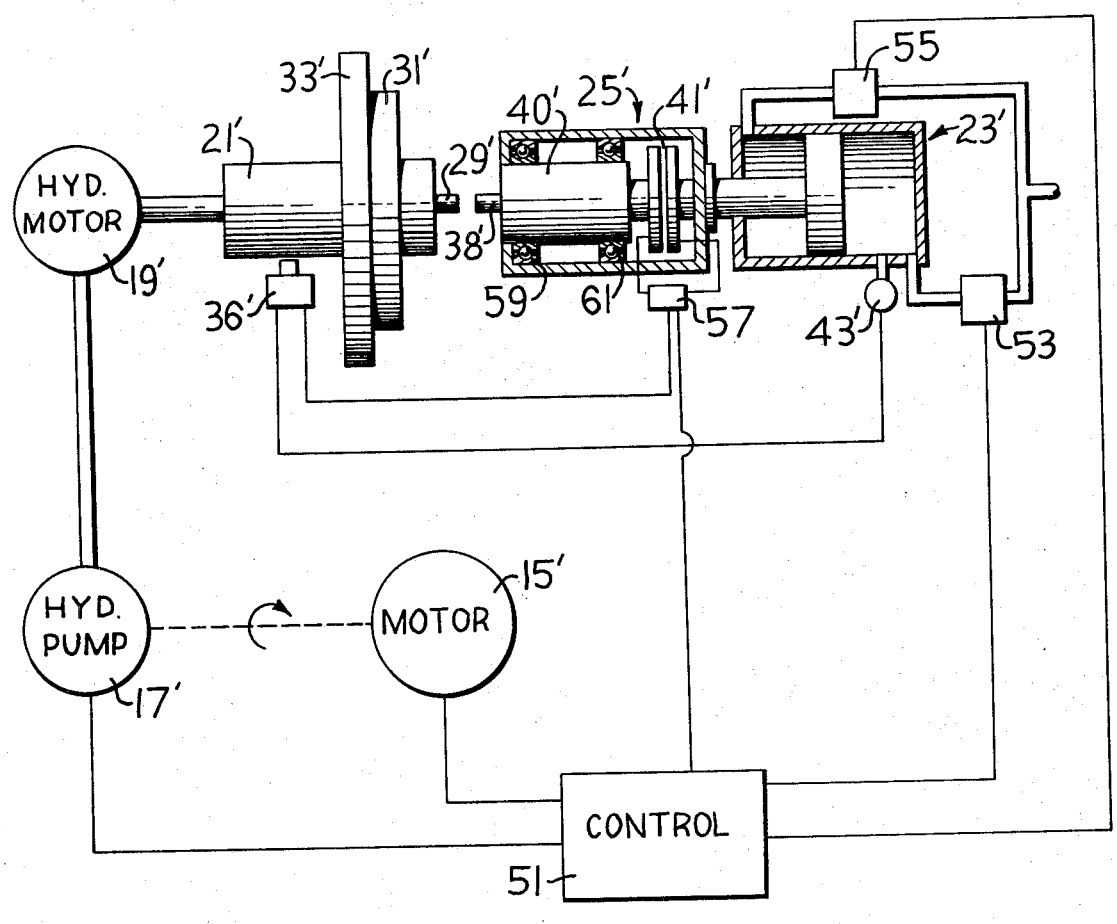

FIG. 2 is a schematic illustration of the invention in which components corresponding to similar components previously described with respect to FIG. 1 are designated by the same numeral with a prime (') symbol.

Assuming that the workpieces 29' and 38' have already been clamped and oriented in their respective chucks, the welding cycle, including final orientation of the workpieces proceeds as follows. A control 51 signals motor 15' to activate, which in turn activates the hydraulic pump 17' and hydraulic motor 19'. Since the spindle 21' is coupled to the hydraulic motor 19', the spindle 21', flywheels 31' and 33' and workpiece 29' will begin to rotate.

At a predetermined and preset speed of rotation, the control 51 signals either the motor 51' or the hydraulic pump 17' to discontinue power to the spindle 21'. At the same time the control 51 signals a valve 53 to open to allow the heal end of a hydraulic ram assembly 23' to become presurrized. The pressurized ram assembly 23' moves the entire tailstock assembly 25' including the fixdely held workpiece 38' forward until the two workpieces come into contact under pressure.

Movement of the ram assembly 23' energizes timing device 4' and after a predetermined and preset lapse of time or weld cycle, the timing device 43' activates the pickup or position sensing device 36'. The pickup device 36' begins to monitor the speed and position of the spindle 21' and at an exact predetermined point of rotation transmits a signal to the brake switch 57. This causes immediate release of the normally coupled brake 41' and the workpiece 38' quickly accelerates to the speed of the rotating workpiece 29'. As shown in FIG. 2 bearing assemblies 59 and 61 are provided for mounting the spindle 40' in a freely rotatable manner.

As previously mentioned once specific parameters have been determined for a given size part and a given material, the exact time and the number of revolutions for the workpiece 38' to attain the speed of the rotating workpiece 29' can be determined. In this manner precise orientation of the workpieces can be programmed into the overall system.

The workpieces are now joined in proper orientation with respect to each other and the slowly rotating system may now be braked to a stop by sending a signal from the control 51 to the brake switch 57 for activating the brake 41'. After the system has come to rest, the welded assembly may be released from the workpiece holding chucks and a valve 25 is opened. Opening of the valve 55 causes hydraulic fluid under pressure to flow into the rod end of the hydraulic ram assembly 23' and the tailstock assembly 25' is moved away from the spindle 21'. The welded assembly can now be removed from the machine and two new weld members may be inserted into the respective holding devices prior to beginning another welding cycle.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A method of inertia friction welding a first workpiece to a second workpiece wherein the joined workpieces are precisely oriented with respect to each other, said method comprising:
    (a) placing a first workpiece in a first rotatable workpiece holding device having an inertia mass associated therewith;
    (b) orienting said first workpiece with respect to indicator means associated with said first rotatable holding device;
    (c) placing a second workpiece in a second rotatable workpiece holding device and orienting the second workpiece with respect to said first workpiece;
    (d) applying a braking force to said second workpiece holding device to fixedly hold said second workpiece holding device against rotation;
    (e) rapidly rotating said first workpiece holding device;
    (f) forcing the workpieces together to produce frictional heat at their common interface which begins formation of a bond at the interface as energy is expended from the inertia mass and the relative rotation slows;
    (g) detecting the position of said indicator means after said bonding cycle has reached a predetermined stage; and,
    (h) releasing said braking force at the second workpiece holding device to allow said second workpiece to join to and rotate with said first workpiece in their original aligned positions.

2. A method as set forth in claim 1 and further including actuating a weld cycle timing device as the workpieces are forced together, actuating a position sensing device in response to said timing device after the bonding cycle has reached a predetermined stage, said position sensing device having means for detecting the position of said indicator means and responsive to said indicator means for releasing the braking force applied to said second workpiece holding device.

3. A method as set forth in claim 1 wherein the inertia mass of said first workpiece holding device is provided by one or more flywheels and wherein said first workpiece holding device is rapidly rotated to a predetermined speed by a motor which motor is disconnected from the first holding device prior to engaging the workpieces under pressure.

4. A method as set forth in claim 1 and comprising reapplying said braking force to stop rotation of both holding devices after said workpieces have been joined together.

References Cited
UNITED STATES PATENTS

| | | | |
|---|---|---|---|
| 3,234,644 | 2/1966 | Hollander | 29—470.3 |
| 3,337,108 | 8/1967 | Taylor | 228—2 |
| 3,417,457 | 12/1968 | Burke et al. | 29—470.3 |
| 3,455,494 | 7/1969 | Stamm | 228—2 |
| 3,462,826 | 8/1969 | Farmer et al. | 29—470.3 |

JOHN F. CAMPBELL, Primary Examiner

R. J. CRAIG, Assistant Examiner

U.S. Cl. X.R.

156—73; 228—2